(12) United States Patent
Schnallinger et al.

(10) Patent No.: US 8,579,334 B2
(45) Date of Patent: Nov. 12, 2013

(54) PIPE WITH INTEGRAL MALE AND FEMALE ENDS, A JOINT MADE USING THE SAME PIPE, AND PROCESSES OF MAKING THE PIPE AND THE JOINT

(75) Inventors: Helmuth Schnallinger, Sarmingstein (AT); Christian Schnallinger, Sarmingstein (AT); Jayprakash Jagannath Kulkarni, Maharashtra State (IN); Kishor Lalchand Nemade, Maharashtra State (IN)

(73) Assignee: Jain Irrigation Systems Limited, Jalgaon, Maharashtra State (IN)

( * ) Notice: Subject to any disclaimer, the term of this patent is extended or adjusted under 35 U.S.C. 154(b) by 109 days.

(21) Appl. No.: 13/057,013

(22) PCT Filed: Jul. 31, 2009

(86) PCT No.: PCT/IB2009/053336
§ 371 (c)(1),
(2), (4) Date: May 27, 2011

(87) PCT Pub. No.: WO2010/015975
PCT Pub. Date: Feb. 11, 2010

(65) Prior Publication Data
US 2011/0220238 A1  Sep. 15, 2011

(30) Foreign Application Priority Data
Aug. 6, 2008 (IN) .......................... 1675/MUM/2008

(51) Int. Cl.
*F16L 21/02* (2006.01)

(52) U.S. Cl.
USPC ........................... 285/364; 285/374; 285/403

(58) Field of Classification Search
USPC ................. 285/374, 311, 364, 312, 305, 403;
264/294, 291, 296, 322, 343;
29/525.01
See application file for complete search history.

(56) References Cited

U.S. PATENT DOCUMENTS

| | | | | | |
|---|---|---|---|---|---|
| 1,143,136 | A | * | 6/1915 | Relitz | 285/311 |
| 3,315,970 | A | * | 4/1967 | Holoway | 285/345 |
| 3,539,205 | A | * | 11/1970 | Johnson, Jr. et al. | 285/423 |
| 3,792,878 | A | * | 2/1974 | Freeman | 285/364 |

(Continued)

FOREIGN PATENT DOCUMENTS

| | | |
|---|---|---|
| DE | 2146726 A1 | 3/1973 |
| DE | 10126976 C1 | 11/2002 |

(Continued)

OTHER PUBLICATIONS

International Search Report dated Dec. 2, 2009 for PCT/IB2009/05336.

*Primary Examiner* — David E Bochna
(74) *Attorney, Agent, or Firm* — Burns & Levinson LLP; Orlando Lopez

(57) ABSTRACT

Attachable and detachable joints for use in pipe systems carrying pressured fluids are made using thermoplastics, preferably polyolefin, and provided with an integrally formed male spigot end and a female socket end. The joints are constructed using a push-fit principle. A sealing ring is inserted into the sealing groove of the female socket making the joint leak proof. Plastic or metal clamps are provided to sustain the longitudinal forces imposed on the joint exerted by the pressured fluid. The male spigot is provided with an integrally formed collar that serves as the holding surface to clamp resisting longitudinal forces.

21 Claims, 10 Drawing Sheets

(56) References Cited

U.S. PATENT DOCUMENTS

| | | |
|---|---|---|
| 3,949,045 A | 4/1976 | Hess et al. |
| 4,059,379 A | 11/1977 | Korff et al. |
| 4,722,555 A * | 2/1988 | Soultatis .................. 285/311 |
| 5,429,398 A * | 7/1995 | Lupke ...................... 285/374 |
| 5,472,659 A | 12/1995 | Hegler et al. |
| 5,554,332 A | 9/1996 | Schnallinger |
| 5,992,469 A * | 11/1999 | Hegler ..................... 138/109 |
| 5,996,635 A * | 12/1999 | Hegler ..................... 138/109 |
| 6,676,886 B2 * | 1/2004 | Corbett, Jr. ............... 264/296 |
| 6,893,055 B2 * | 5/2005 | Thomas et al. ............ 285/369 |
| 6,962,373 B2 * | 11/2005 | Houghton .................. 285/374 |
| 7,238,317 B2 * | 7/2007 | Hegler ...................... 264/508 |
| 7,249,789 B2 * | 7/2007 | Haney et al. .............. 285/374 |
| 7,300,078 B2 * | 11/2007 | Yamamoto et al. ........ 285/364 |
| 7,942,456 B2 * | 5/2011 | Duggan et al. ............ 285/374 |

FOREIGN PATENT DOCUMENTS

| | | |
|---|---|---|
| DE | 10128220 A1 | 1/2003 |
| FR | 1562518 A | 4/1969 |
| FR | 2263870 A1 | 10/1975 |
| FR | 2577299 A1 | 8/1986 |
| GB | 1166484 A | 10/1969 |
| GB | 1394317 A | 5/1975 |
| WO | 0049324 A1 | 8/2000 |
| WO | 2008026155 A2 | 3/2008 |

* cited by examiner

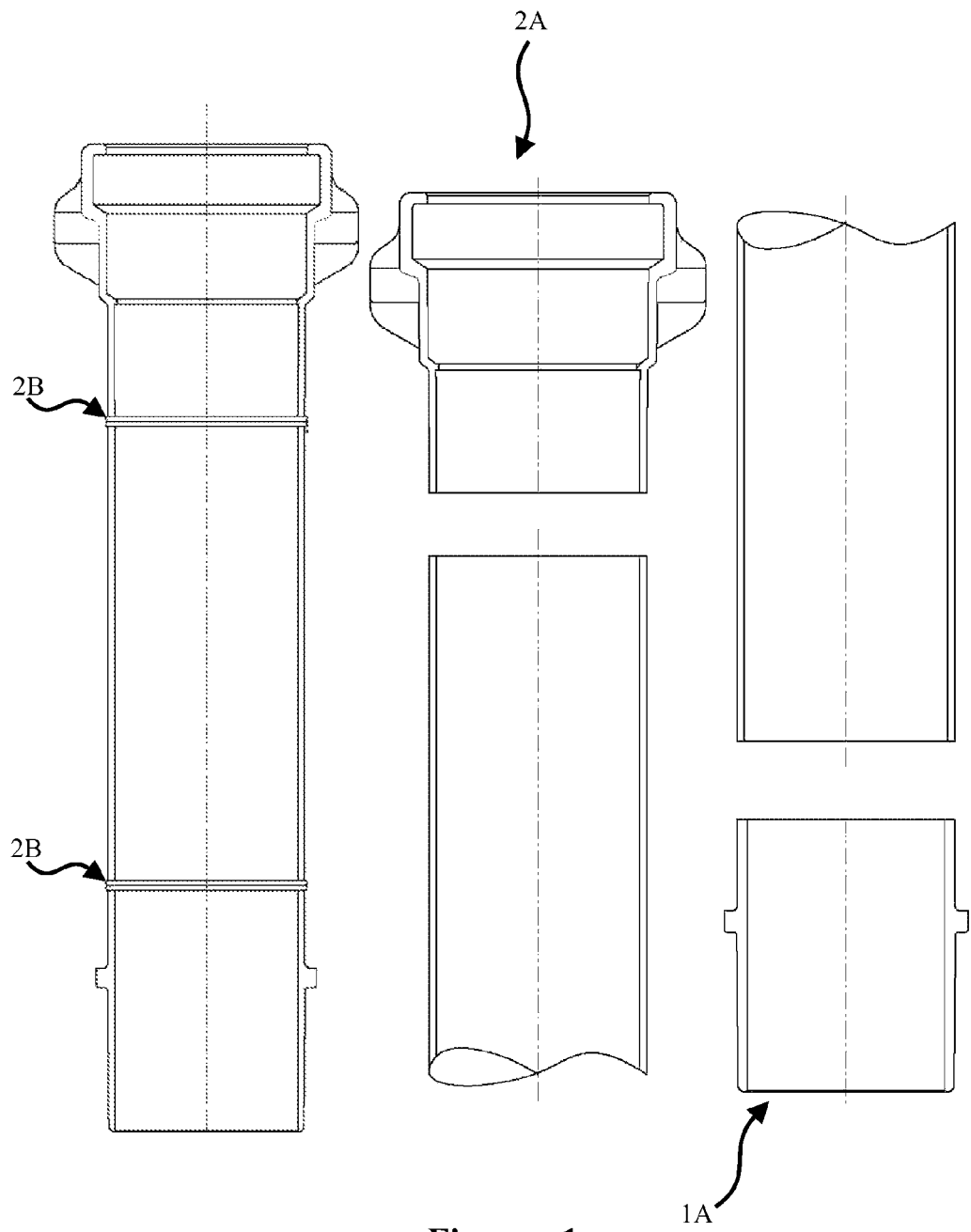
Figure : 1

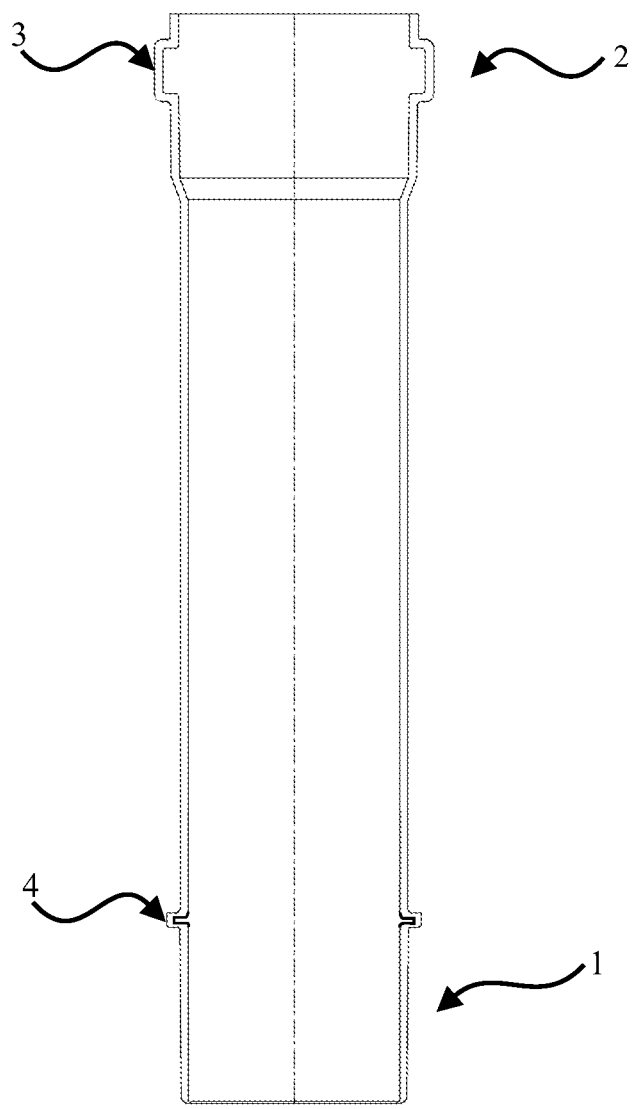
Figure : 2

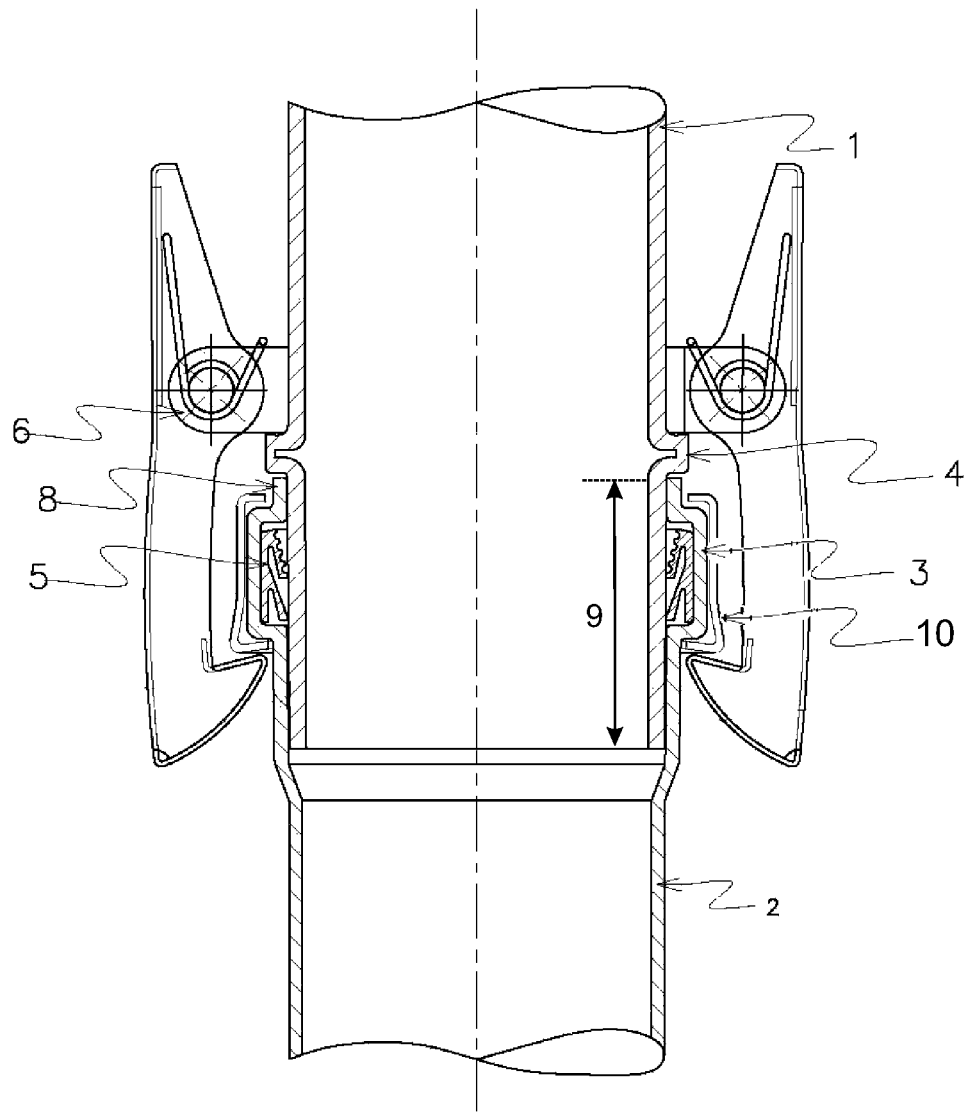
Figure : 3

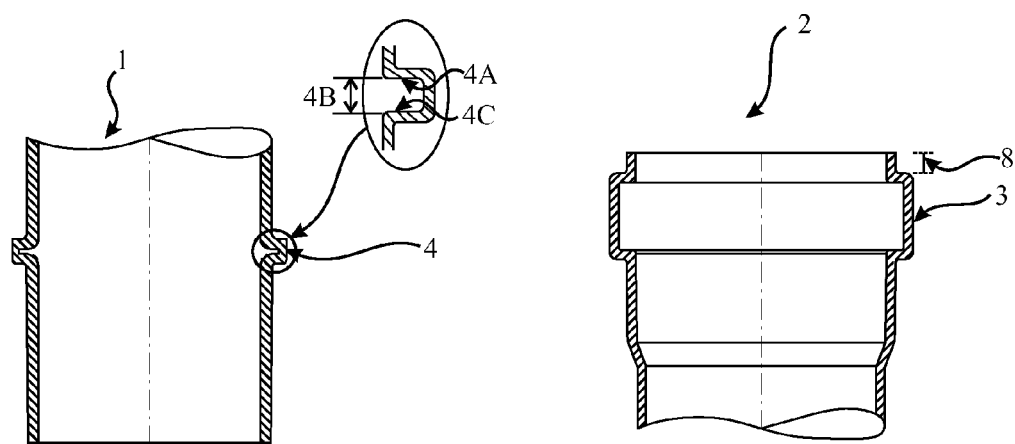
Figure : 4
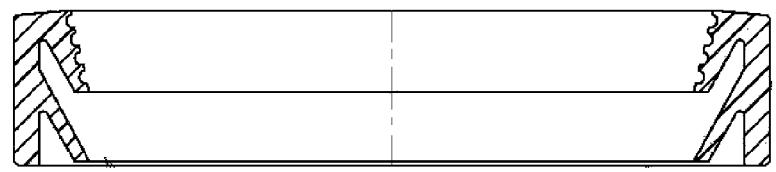
Figure : 4A

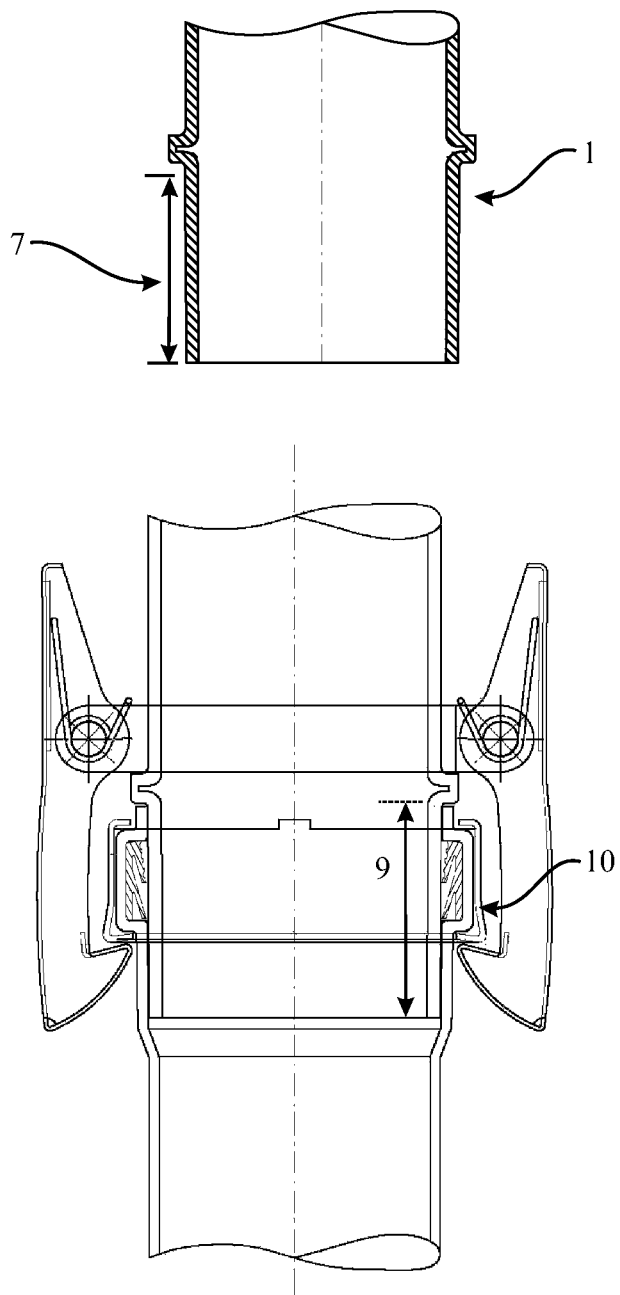
Figure : 5A

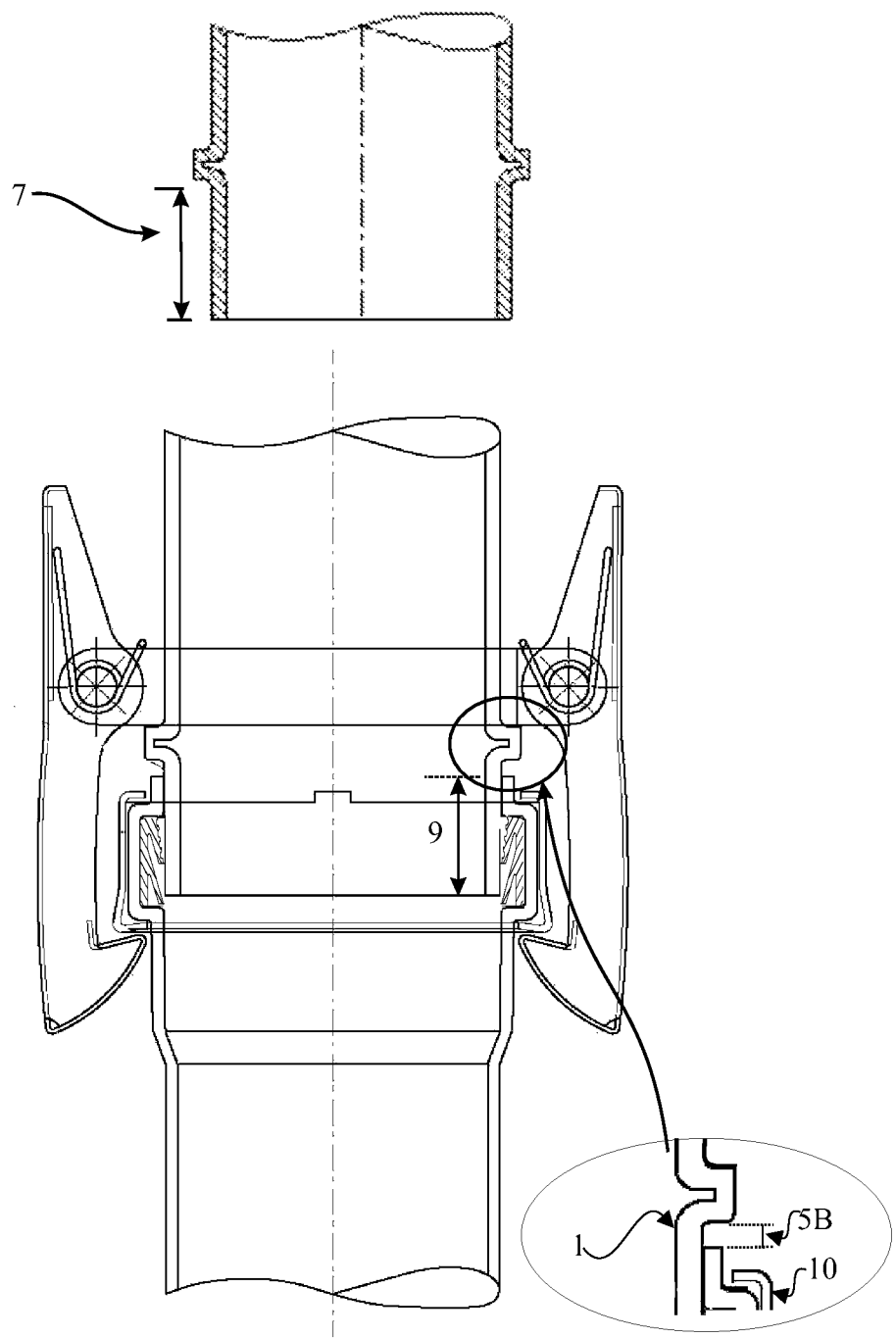
Figure : 5B

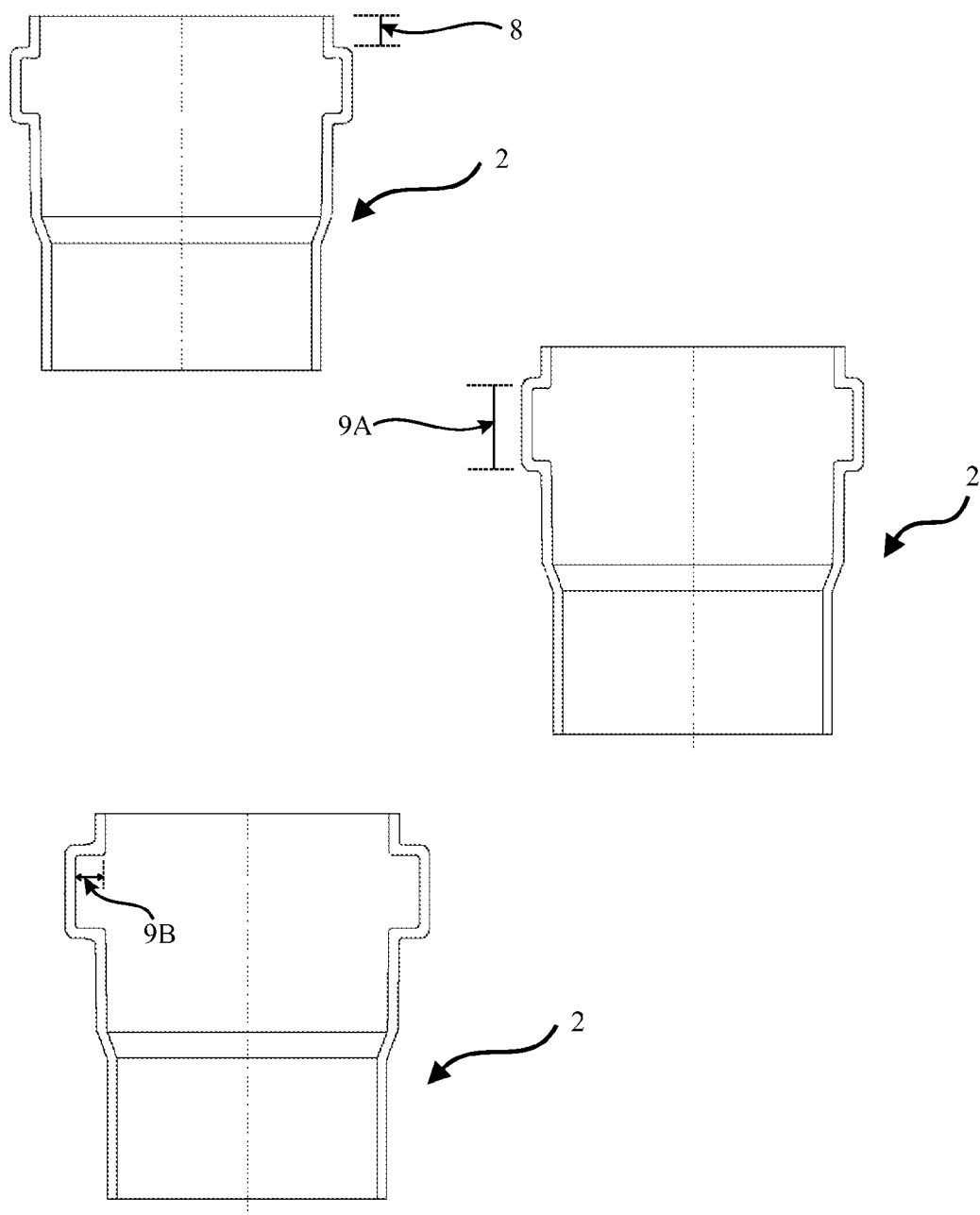
Figure : 6

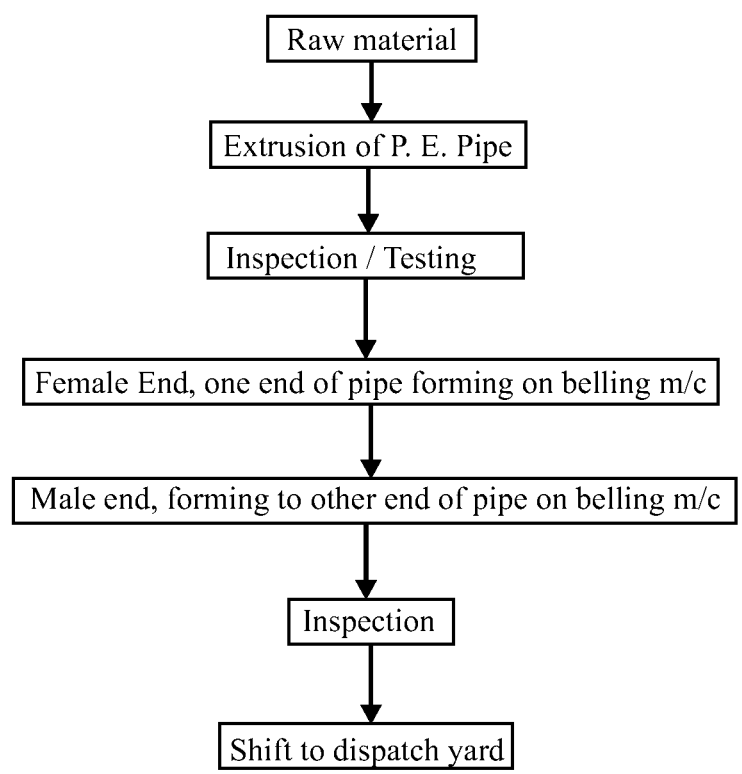
Figure : 7

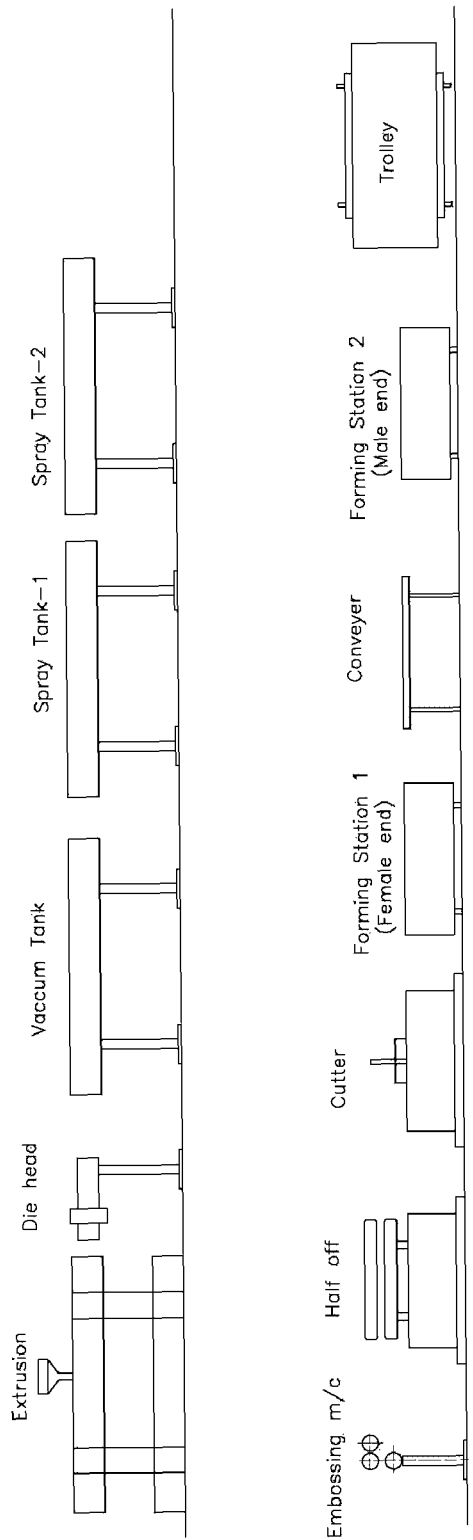
Figure : 8

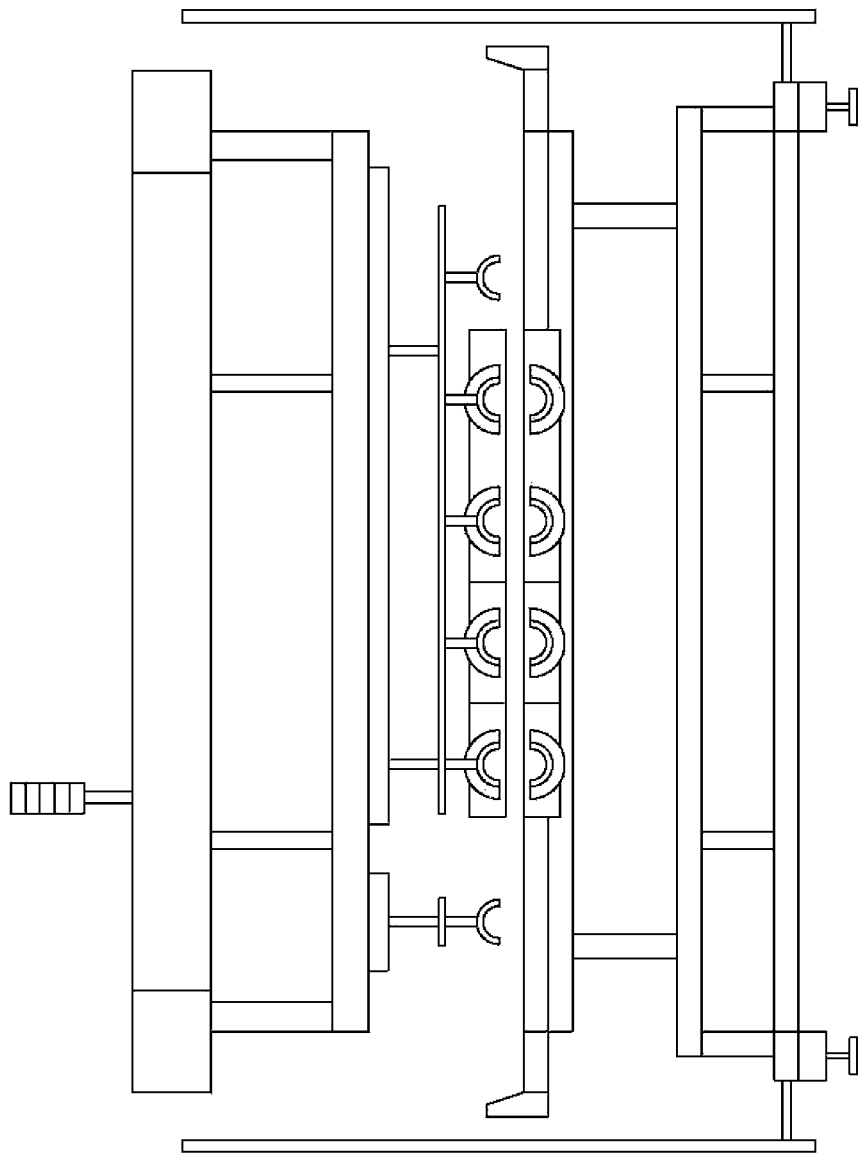
Figure : 9

PIPE WITH INTEGRAL MALE AND FEMALE ENDS, A JOINT MADE USING THE SAME PIPE, AND PROCESSES OF MAKING THE PIPE AND THE JOINT

CROSS-REFERENCE TO RELATED APPLICATIONS

This application is a U.S. national stage application under 35 U.S.C. 371 of International Application No. PCT/IB09/153336 filed on Jul. 31, 2009 and entitled A PIPE WITH INTEGRAL MALE AND FEMALE ENDS, A JOINT MADE USING THE SAME PIPE, AND PROCESSES OF MAKING THE PIPE AND THE JOINT, which in turn claims priority to Indian Patent Application No, 1675/MUM/2008 filed on Aug. 6, 2008.

FIELD OF INVENTION

The present invention relates generally to the field of forming joints for plastic tubing. More specifically, the present invention relates to permanent, leak-proof joints in polyolefin tubes made with integral male and female ends and a method of forming such tubes and joints.

BACKGROUND OF INVENTION

Pipes typically known as 'Quick Connect' pipes and joints systems made using these pipes have been used in sprinkler irrigation since last so many years. These joints are easily assembled and disassembled in field conditions and used in systems for conveyance of pressured fluids. Pipes used in such systems are typically the extruded type. The male and female ends are manufactured separately by injection moulding. The moulded ends are welded to a pipe's plain ends to make a pipe length suitable for joining with other pipes. Each pipe thus has a male and a female end.

The male and female ends can be welded to the pipe in a number of ways such as butt fusion welding, socket fusion welding etc. The female sockets are further machined to form grooves for placing rubber rings that help form a seal. Waste material produced during the grooving process is normally recycled. The pipes fitted with male and female ends thus produced are easily connected with and disconnected from each other. In the case of systems carrying fluids under pressure, a clamp is used to hold securely the joints thus formed to withstand pressure, and sealing rings are used to make the joints leak-proof.

Piping systems with easily assembled and disassembled coupling arrangements used for conveyance of pressured fluids are available. An ideal pipe system that is deployed in transportable sprinkler irrigation systems which are operated under pressured fluids should be designed so that the following requirements are met:

It withstands the applied pressure.
It is easy to install and dismantle in field.
The joints are leak-proof
The pipe ends, which are generally prone to damage, are unbreakable.
The pressure drop should be minimum.
The system must be cost effective.

Many of the existing piping systems used for sprinkler irrigation fulfill the first three requirements from the above list of requirements, however, most of these systems suffer from drawbacks such as:

The welds of male and female ends can fail if proper welding procedures are not followed.
The welded joints, due to their roughness and irregular surface, cause restriction to flow of water, which results in pressure drop across the joint.
The joints are created using injection moulding technique thus requiring heavy investment in injection moulding machine and equipment, in a business that otherwise would be operating on a extrusion technique.
A separate huge inventory of moulded articles needs to be maintained to fulfill requirements on time, leading to huge space requirement.
Substantial amount of welding equipment is required to manufacture welded joints in large quantities.
The welded joints also require to be machined to the required groove in moulded female end which also generates waste.
Another drawback is that the existing systems typically require skilled manpower to produce good quality welded joints.
Weld quality can vary dependent upon the operator skill
In order to overcome the restriction-to-flow drawback, there have been attempts to make the inner edge of the pipe at the plane of the joint as smooth as possible by a debeading operation. This helps in reducing the flow restriction, which ultimately reduces pressure drop over the length of the joint. However, this method is not effective in sprinkler piping system as the pipes used are generally thin walled and debeading operation poses a serious risk to the integrity of the weld joint, possibly resulting in weld failure. The debeading operation is also time consuming and thus increases the cost of the irrigation system.
There have been attempts to eliminate the post-forming operation of machining grooving in a moulded female end. In one such attempt, a collapsible mould was used to form groove directly, however, shrinkage could not be controlled effectively, as a result of which the grooves formed were not of good quality. Uneven shrinkage properties of polyolefin during moulding lead to change in article wall thickness. The uneven shrinkage ultimately results in problems relating to sealing of joints and assembling the pipe system.
In the U.S. Pat. No. 5,554,332, Schnallinger discloses a process of manufacturing shaped elements from synthetic thermoplastics, in which plastic material (synthetic thermoplastics) is heated to a temperature above its softening point and shaped to form the shaped element. The shaped element is subsequently cooled to a temperature below its softening temperature.
However, Schnallinger did not teach how to create a thermoplastic pipe that has an integrally formed male spigot and a female socket at once. Nor did he teach how to make a leakproof joint from a thermoplastic pipes with such male and female ends.
There is therefore a need to provide a system of joints which will fulfill all the requirements as specified above for long life working of piping system used in sprinkler irrigation at lowest cost, and which will not suffer from any of the drawbacks mentioned above.

Objectives and Advantages:

Accordingly, the objectives & advantages of the present invention are as described below.

An objective of the invention is to provide a system of joints suitable for use in irrigations system and made from pipes that are provided with integral male & female ends so as to:

Eliminate the need for injection moulding of male & female ends.

Eliminate the need for welding activities.
Eliminate the risk of welded joint failure.
Minimize the pressure drop across the pipe joints.
Eliminate the coupler grooving activities.
Eliminate the material wastages during female end groove machining.
Ensure that the system will withstand the pressure applied in the system and is leak proof
Ensure that the system is easy to install & dismantle in field
Ensure that the system does not suffer from shrinkage effects
Ensure that the system is cost effective.

Another object of the present application is to provide a process by which the pipes with integrally formed male and female ends proposed in this invention are manufactured.

BRIEF DESCRIPTION OF FIGURES

FIG. 1—Existing male and female sockets and welded pipe assembly
FIG. 2—Pipe with integrally formed male and female ends
FIG. 3—A section through the joint of the present invention)
FIG. 4—longitudinal sections of the male spigot and the female sockets
FIG. 4A—cross section of the seal ring
FIGS. 5A and 5B—The effect of entry length of the male socket
FIG. 6—Variations in the female socket configuration
FIG. 7—Flow chart of the process of the invention
FIG. 8—Schematic of the process of the invention
FIG. 9 shows a belling machine

SUMMARY OF THE INVENTION

The invention describes easily attachable and detachable joints for use in pipe systems carrying pressured fluids. The pipes used for the purpose are made using thermoplastics, preferably polyolefin and provided with integrally formed male and female ends. Any material from the entire polyolefin group is acceptable for use. The invention also discloses a method of forming such tubes along with their male spigot and the female sockets.

The process of manufacturing the integral male & female ends of extruded pipes disclosed herein is characterized in that the ends of extruded pipe are heated and expanded in a controlled manner to form either a male a spigot or a female socket, each pipe having a male spigot at one end and the female socket at the other. The male spigot thus formed in the heated state has an external diameter which is 0.5 to 5% in excess of the desired final pipe diameter (this is independent of the material), and the female socket thus formed has an internal diameter which is 0.5 to 5% in excess of the desired final pipe diameter, and which is independent of the material. The resulting male spigot or the female socket is cooled and subsequently compacted in a pressing tool to have a diameter such that when released from the pressing tool, the socket will undergo an elastic expansion to have the desired final diameter.

Joints using the pipes provided with integral male and female ends are constructed using a push-fit principle. A sealing ring is inserted in the sealing groove made in the female socket thereby helping make the joint leak proof. Plastic or metal clamps are provided to sustain the longitudinal forces imposed on the joint exerted by the pressured fluid. The male spigot is provided with an integrally formed collar that serves as the holding surface to clamp resisting longitudinal forces. The joint is simple in its construction, easy to assemble in field & cost effective.

LIST OF PARTS

| Part No. | Name |
| --- | --- |
| 1. | Integrally formed male end or male spigot of pipe |
| 1A | Conventional male spigot |
| 2. | Integrally formed female end or female socket of pipe |
| 2A | Conventional female socket |
| 2B | Weld |
| 3. | Sealing ring groove |
| 4. | Collar at male end |
| 4A | Internal upper surface of collar |
| 4B | Internal gap of the collar |
| 4C | Internal lower surface of the collar |
| 5 | Sealing ring |
| 5B | Collar gap |
| 6 | Holding Clamp |
| 7 | Male Entry length |
| 8 | Female Entry length |
| 9 | Depth of Engagement |
| 9A | Width of the sealing ring groove |
| 9B | Height of the sealing ring groove |
| 10 | Metal ring on female socket |

DETAILED DESCRIPTION OF THE INVENTION

The invention describes a novel leakproof joint for use in pipe systems which carry fluids under pressure. The invention also discloses a method of forming male spigots and female sockets integrally on extruded polyolefin pipes.

As shown in FIG. 1, the existing available pipe systems with joints are made with pipes that have welded-on male spigots (1A) and female sockets (2A). Male spigots (1A) and female sockets (2A) are formed by means such as intrusion moulding separately and joined onto the pipe ends using welds (2B).

The most preferred embodiment of the invention is now described.

In the preferred embodiment of the invention, a joint made from pipes having integrally formed male spigots and female sockets on either ends is described (see FIG. 2). FIG. 4 shows the longitudinal sections taken through the male and female ends and also through the pipe joint, and FIG. 3 shows a cross-sectional view of the assembled pipe joint.

A leakproof joint is formed by inserting the integrally formed male (1) spigot of one pipe into the integrally formed female (2) socket of another pipe and holding the joint thus formed together with the help of means such as a holding clamp (6).

The joint of the preferred embodiment further comprises an arrangement for sealing, which together with the holding clamp enables the formed joint to withstand fluid pressure in the field situation. The sealing arrangement comprises a sealing ring (5) placed inside the sealing ring groove (3) to prevent fluid leakage whereas the holding clamp (6) provides secure locking against axial movement due to fluid pressure. As shown in FIG. 4A, the sealing ring preferably has a serrated internal surface.

While Schnallinger has described the process of forming an integrally formed female socket at one end of a pipe, no one has since thought of making a pipe that has a female socket thus formed at its one end and a male spigot at the other. No one has since further thought of using such pipes to form joints that can be used in pipe systems that carry pressured fluids used in open field conditions. Pipes with integrally formed female sockets have been in use in pipe systems that carry fluids with pressure but these pipes need to be buried in the ground or some anchoring has to be done to keep it integral. This makes their use expensive and cumbersome. In such instances, the plain end of the pipe is uses as a male end and joints are formed by simply inserting the male end into the female socket with or without sealing. Such joints are unsuitable for use in systems carrying fluids under pressure in open field condition. For making joints suitable for use in systems carrying pressured fluids, special male spigots are formed separately and welded onto the pipe ends as described earlier.

Therefore, one key novel feature of the invention is the integrally formed male spigot with a collar & female sockets at either ends of the same pipe. The formation of the collar is hugely important at it allows use of a clamp necessary to form a leakproof joint suitable for use in pressured pipe systems, which can be used in open field condition.

In the present invention, instead of using injection moulded pieces which are produced separately from the pipes and then welded to the pipe ends, and as is the current practice in the related industry, the inventors have advantageously made a pipe where integral male spigot (1) with a collar & female sockets (2) are formed at the end of the pipes after the pipe extrusion process. The integral female (2) socket has a sealing ring groove (3) on its inside surface and the integral male (1) socket has corresponding collar (4) on its external surface. The inventors have found that the collar (4) advantageously secures the pipe against the axial movement and acts as stopper for male (1) spigot's entry length (7) into the female (2) socket. It is important that the collar is formed such that the two faces (the internal upper surface (4A), and the internal lower surface (4C) of the collar are as near to each other as possible whereby the internal gap (4B) of the collar is minimized. This improves greatly the strength of the collar against the clamp forces. Collars which are formed without attention to this aspect are not strong enough and become damaged by the stresses induced by the clamp.

FIG. 3 shows longitudinal section of pipe taken through a typical male (1) end. The male (1) end shows the formed collar (4) and male entry length (7). The male entry length (7) sits inside the female (2) end compressing the sealing ring (5) and making the joint leak-proof.

FIG. 3 also shows a longitudinal section of pipe taken through a typical female (2) end. This shows the sealing ring groove (3), female entry length (8), which is the length of the pipe beyond the sealing ring groove, depth of engagement (9) of male and female ends, and a metal ring (10) on female end (2). The depth of engagement is of importance as the integrity of the joint and its leakproofness depends on its adequacy. It is defined as the length of overlap between the portion of the male spigot beyond its collar and the female socket. The provision of female entry length (8) beyond the sealing ring groove helps in ensuring a proper alignment during assembly. The metal ring (10) on female socket (2) helps to withstand the pressure in the system & to avoid the deformation of groove diameter which ultimately ensures that the joint remains leakproof.

Construction of the Assembled Joint:

To construct the joint as disclosed in the preferred embodiment and as shown in FIG. 2, a sealing ring (5) is placed inside the sealing ring groove (3) which is provided inside of the integral female (2) socket of pipe. Next, the integrally formed male spigot (1) is inserted or push-fitted into the integrally formed female (2) socket of another pipe, preferably till the collar (4) touches the top of the female entry (8) length. Next, the holding clamp (6) is put in place which ensures that the pipe remains held in place under the axial forces. The resultant joint is leak-proof without any possibility of breakage.

As discussed earlier, the integrity of the joint and also its leakproofness depends in part on the magnitude of the depth of engagement. It is important to provide sufficient depth of engagement so that when operating under the fluid pressure, the joint doesn't open up by the male spigot slipping out of the female socket. The greater the depth of engagement, the more difficult it is for the male spigot to come out of the female socket. It is important to ensure that the entry length of the male end is sufficient so that the end of male end is outside the sealing ring area, preferably resting on the chamfer of the female socket. This is indicated in FIGS. 5A and 5B, where it can be seen that the collar gap (5B) between the external lower surface of the collar and the top of the female entry length is minimized, preferably these two parts touching.

There are several variations possible of the female socket, as shown in FIG. 6, which shows the width (9A) and height (9B) of the sealing ring groove. These dimensions may vary to suit the size of the sealing rings available. Variations are also possible where the female sockets are produced with or without a female entry length (8), and the sealing ring groove of variable longitudinal and cross-sectional depths.

In another embodiment of the present invention a method to manufacture the pipes with integrally formed male spigot end and integrally formed female socket ends is disclosed. This is explained with the help of a flow chart (FIG. 7), and a schematic diagram (FIG. 8). The process comprises the steps of:

- supplying raw material
- extruding the pipe of predetermined diameter using a standard forming process
- using a novel belling machine to form a female end socket at one end
- using a novel mandrel to form a male spigot with a collar at the other end of the pipe The process of forming the pipes with male and female ends and making joints using them is now described. The pipes that are formed using a standard process of forming are picked up by a belling machine, preferably directly from the conveyer belt of the extrusion line. The pipe distance is set so that the socket is not shortened. A transport system moves the pipes, preferably a number of them at a time, to the heating station, where the pipe end lengths are heated so that the belling operation can be performed.

Once the pipe ends are softened adequately, they are placed in a socket and spigot forming station where male spigots and female sockets are formed in any sequence, that is, male spigots first and female sockets later or vice versa. The size of spigots and sockets in the heated state is somewhat larger than their final size in the cooled down state. The spigots and sockets formed are cooled down in an anti-shrinkage station, where they are cooled down under the application of pressure, whereby the final sockets are of desired size.

The male spigot is formed by the forming process under the action of blowing and pressurizing using a specially designed mandrel. A person skilled in the art will know the difficulties in integrally forming the male spigot with a collar during a process of pipe extrusion. When the belling operation on the male spigot forms the collar, the mandrel applies longitudinal pressure on it to ensure that the width of the collar is minimized such that the two internal surfaces of the collar come as close to each other as possible. This is achieved by application of longitudinal pressure applied from the male end, preferably across entire thickness of the pipe, after the collar has been formed. The difficulties arise in providing grip to the pipe end, inserting an implement to form the collar in the pipe, and the shrinkage issues. The conventional wisdom has therefore been to form the male socket separately and attach it by means such as welding to the pipe end. As discussed earlier, this has several drawbacks.

One of the other key features of the present invention is the anti-shrinkage measure that is provided during the process of the invention. The steps of forming sockets are carried out using a purpose built plant which has special forming stations for the male and female ends.

The shrinkage phenomenon is due to the latent memory in the molecular structure of the polyolefin by which the intermolecular space reduces once the material cools down. This 'memory effect' is effectively eliminated with the use the anti shrinkage technology in which the male and female sockets are constructed to a larger than final size and cold-pressed into the final size. The inventors have observed that this method eliminates any shrinkage that would result from the pipes that are cooled down. The major disadvantage of shrinkage is that the dimensional changes are uncontrolled and non-uniform. The anti shrinkage technology allows a controlled reduction from the larger to smaller size of a formed part such that the final size and shape of the final part is to the desired specification and the male and female sockets thus formed are uniform and dimensionally stable in the field conditions.

Testing:

Testing was performed in accordance with IS: 14151 PART—2.

Three tests were performed on joints made in accordance with the preferred embodiment: a holding attachment (clamp) test, a leakage test, and a hydraulic proof test.

The Holding Attachment (Clamp) Test:

The holding attachment test was designed to observe integrity of the holding attachment while under field conditions. IS: 14151 PART—2 stipulates that in the case where any external attachment is provided for holding the coupler parts to from a quick leak proof joint of a pipe system carrying fluid under pressure, the holding attachment must be strong enough to withstand the pressure two times the working pressure of the pipes. Accordingly a clamp was fitted on a joint made from 75 mm OD polyolefin pipes using the present invention to carry water under 6.4 kg/cm2 pressure. The joint was observed for one hour for visible distortion of pipes and the holding clamp. No deformation of either the pipes or the holding was observed.

Leakage Test:

Joints were assembled along with the clamps put in place. In accordance with IS: 14151 PART—2, the joint was placed in a test system that carried water as fluid under a pressure which was raised from 0 kg/cm2 to its maximum value of 6.4 kg/cm2 over a period of 5 minutes. The joint was observed at the maximum pressure for one hour during which period no leakage was observed. Although the test standards stipulates that for pressure activated joints of the type the present invention discloses, there shall be no leakage at or beyond the pressure of 0.05 Mpa, the inventors have tested the joint for a much higher value.

Hydraulic Proof Test:

Joints were assembled along with the clamps put in place. In accordance with IS: 14151 PART—2, the joint was placed in a test system that carried water as fluid under a pressure which was raised from 0 kg/cm2 to its maximum value of 6.4 kg/cm2 over a period of 5 minutes. The joint was observed at the maximum pressure for one hour during which period no distortion of individual parts of the joint or deformation of the joint as a whole were observed. The joint did not show any visible signs of swelling, weeping or deformation and did not burst during the prescribed test duration.

The test results have been incorporated in Table 1.

TABLE 1

| No. | Test description | Test pressure $kg/cm^2$ | Test duration Hrs. | No. of samples tested | remark |
| --- | --- | --- | --- | --- | --- |
| 1 | Leakage test | 0.5 | 1 | 5 | No leakage found |
| 2 | Hydraulic proof test | 6.4 | 1 | 5 | No leakage found |
| 3 | Holding attachment | 6.4 | 1 | 5 | No deformation found |
| 4 | Leakage test | 6.4 | 1 | 5 | No Leakage found |

In summary, the inventors have found that the novel quick connects integral pipe joint described in the present invention has the advantages such as:

It eliminates the injection moulding of male & female ends.
It eliminates the welding activities.
It eliminates the risk of welded joint failure.
It minimizes the pressure drop as there are no rough surfaces or protrusions that could restrict the flow.
It eliminates the coupler grooving activities.
It eliminates the generation of wastages during female end grooving.
It withstands the pressure applied in the system and is leak proof.
It is easy to install & dismantle in field
It is cost effective.
Provides the metal ring on female socket so when pressure applied in the system, groove dia.
Joints are not deformed and are leak proof.

In view of the details given in foregoing description of the present invention, it will be apparent to a person skilled in the art that the present invention basically comprises the following items:

1. A pipe made with integrally formed male spigot at one end of said pipe, wherein said male spigot has an integrally formed collar.
2. A pipe as described in item 1 wherein said pipe further comprises an integrally formed female socket at the other end of said pipe, wherein said female socket preferably has an integrally formed sealing ring groove.
3. A joint made using two separate pipes, each of the pipes being as described in item 2, wherein said joint further comprises a holding clamp, a sealing ring, and a female socket ring, wherein
said joint is formed by inserting said male spigot of one of the two pipe into said female socket of the other pipe, the sealing ring groove of which houses said sealing ring, such that the necessary depth of engagement is achieved, followed by applying a clamp to secure said male spigot and said female socket in an engaged position.
4. A joint as described in item 3, wherein the male entry length is such that the end of the male spigot is well outside the sealing ring area, said male spigot end preferably resting on the chamfer of the female socket.

5. A novel joint as described in item 3 wherein said collar is positioned such that it preferably touches the top of the female entry length thereby acting as stopper for said male spigot's entry length into said female socket.
6. A novel joint as described in item 3 wherein the internal gap of said collar is small, preferably 0 mm.
7. A novel joint as described in item 3 wherein said pipes are made from thermoplastic resins, preferably polyolefin, preferably using extrusion forming process.
8. A process of making a pipe, one end of which has an integrally formed male spigot with a collar and the other end an integrally formed female socket, comprising the steps of:
    a. extrusion forming said pipes, preferably formed using a standard process of extrusion forming
    b. heating the formed pipes at a heating station
    c. forming in a socket and spigot forming station, in any order, a female socket at one end of the pipe preferably using a belling machine, and forming a male spigot with a collar at the other end using appropriate means, preferably a mandrel, such that the size of the socket and spigot formed in the hot pipe is somewhat larger, preferably 0.5%, than their respective final sizes,
    d. ensuring that the width of the collar is adjusted to a minimum,
    e. cooling along with application of suitable pressure, the integrally formed male spigot and female sockets in an anti shrinkage station.
9. A process of making a novel joint using two pipes made using the process as described in item 8, wherein the steps of making said joints comprise:
    a. inserting a sealing ring into the sealing ring groove of said female socket of one of the two pipes
    b. inserting said male spigot of one of the two pipe into said female socket containing said sealing ring groove,
    c. ensuring that a necessary depth of engagement is achieved between the male spigot and female sockets referred to in step b,
    d. applying a holding clamp to secure said male spigot and said female socket in an engaged position, thereby forming a secure joint.

Although the invention has been described with reference to certain preferred embodiments, the invention is not meant to be limited to those preferred embodiments. Alterations to the preferred embodiments described are possible without departing from the spirit of the invention. However, the process and composition described above are intended to be illustrative only, and the novel characteristics of the invention may be incorporated in other forms without departing from the scope of the invention.

The invention claimed is:

1. A pipe joint assembly for imparting a lock-fit arrangement to a pair of pipe segments, the pipe joint assembly comprising:
    two pipe units, one pipe unit having a male spigot at one end and another pipe unit having a female socket at the other end; the male spigot of said one pipe unit concatenated with the female socket of said another pipe unit in a push-fit manner, thereby constituting the pipe joint assembly; the male spigot comprising an integral annular collar; the integral annular the collar protruding radially outward from the male spigot; the female socket comprising an integral annular sealing ring groove;
    the pipe joint assembly also comprising:
        a. a sealing ring, firmly placed inside the sealing ring groove of the female socket of said another pipe unit;
        b. a female socket ring, circumferentially enveloping the sealing ring groove on the outside surface of said female socket;
        c. a holding clamp, configured for automatically conferring a secured lock-fitting status to coupling of male and female ends based on push-fit mechanism; a top seat of the holding clamp disposed above the integral annular collar; a bottom seat of the holding clamp disposed below the female socket ring and the integral annular sealing ring groove and substantially in contact with the female socket ring.

2. The pipe joint assembly as claimed in claim 1, wherein the sealing ring has a serrated internal surface.
3. The pipe joint assembly as claimed in claim 1, wherein said female socket ring circumferentially envelopes the outer surface of said female socket at a protrusion adjacent to the sealing ring groove.
4. A pipe joint assembly as claimed in claim 1, wherein said female socket ring acts as a lock-support for the holding clamp during the secured lock-fit arrangement of the joint.
5. The pipe joint assembly as claimed in claim 1, wherein each of two pipe units is made of thermoplastic material.
6. The pipe joint assembly as claimed in claim 5, wherein the thermoplastic material is a polyolefin.
7. The pipe joint assembly as claimed in claim 1, wherein an internal gap of the integral annular collar is substantially 0 mm.
8. The pipe joint assembly as claimed in claim 1, wherein the collar acts as a holding surface for the holding clamp.
9. The pipe joint assembly as claimed in claim 1, wherein said female socket has one or more sealing ring grooves.
10. The pipe joint assembly as claimed in claim 1, wherein said female socket has only one sealing ring groove.
11. The pipe joint assembly as claimed in claim 1, wherein said female socket has a female entry length extending beyond said sealing ring groove towards a pipe unit end.
12. The pipe joint assembly as claimed in claim 1, wherein an inside diameter of said female socket it relatively larger than an inside diameter of a rest of the pipe unit.
13. The pipe joint assembly as claimed in claim 12, wherein a chamfer is formed in the female socket at the interface of said female socket and said male spigot.
14. The pipe joint assembly as claimed in claim 1, wherein an outer surface of an entry length of the male spigot is tapered towards said one end so as to enable easy insertion of the male spigot into the female socket.
15. A process of making a pipe, one end of which has an integrally formed male spigot with a collar and the other end an integrally formed female socket, comprising the steps of:
    a. extrusion forming said pipes using a standard process of extrusion forming;
    b. heating the formed pipes at a heating station;
    c. forming in a socket and spigot forming station, in any order, a female socket at one end of the pipe using a belling machine, and forming a male spigot with a collar at the other end using appropriate means such that the size of the socket and spigot formed in the hot pipe is about 0.5% of their respective final sizes; wherein the appropriate means comprise a mandrel;
    d. ensuring that the width of the collar is adjusted to a minimum by applying longitudinal pressure in the mandrel across the entire thickness of the pipe after the collar has been formed; and
    e. cooling along with application of suitable pressure, the integrally formed male spigot and female sockets in an anti shrinkage station.

16. A process of making a novel joint using two pipes, one end of each pipe having an integrally formed male spigot with a collar; the collar formed integrally with the male spigot and protruding radially outward from the male spigot, and another end of each pipe having an integrally formed female socket, wherein the steps of making said joints comprise:
   a. inserting a sealing ring into a sealing ring groove of said female socket of one of the two pipes;
   b. inserting said male spigot of another one of the two pipes into said female socket containing said sealing ring groove;
   c. ensuring that a necessary depth of engagement is achieved between the male spigot and female sockets referred to in step b by inserting said male spigot until said female socket substantially reaches the collar in said male spigot;
   d. applying a holding clamp to secure said male spigot and said female socket in an engaged position; and
   e. ensuring that the holding clamp is automatically lock-fitted during the engagement thereby forming a secure joint for imparting a lock-fit arrangement; wherein, a top seat of the holding clamp is disposed above the collar in said male spigot; a bottom seat of the holding clamp is disposed below and substantially in contact with a female socket ring, the female socket ring circumferentially enveloping the sealing ring groove on the outside surface of said female socket.

17. The method of claim 16 insertion of the male spigot inside the female socket is such, that the end of the male spigot reaches beyond a sealing ring area, and rests on a chamfer of the female socket upon reaching the lock-fit arrangement.

18. The method of claim 16 wherein the male spigot is inserted inside the female socket until a top of a female socket entry length touches a male spigot collar which thereby acts as a stopper for the entry of said male spigot inside said female socket.

19. A pipe joint assembly for imparting a lock-fit arrangement to a pair of pipe segments, the pipe joint assembly comprising:
   two pipe units one pipe unit having a male spigot at one end and another pipe unit having a female socket at the other end; the male spigot said one pipe unit concatenated with the female socket of said another pipe unit in a push-fit manner, thereby constituting the pipe joint assembly; the male spigot comprising an integral annular collar; the female socket comprising an integral annular sealing ring groove;
   the pipe joint assembly also comprising:
   a. a sealing ring, firmly placed inside the sealing ring groove of the female socket of said another pipe unit;
   b. a female socket ring, circumferentially enveloping the sealing ring grove on the outside surface of said female socket;
   c. a holding clamp, configured for automatically conferring a second lock-fitting status to coupling of male and female ends based on push-fit mechanism; a top seat of the holding clamp disposed above the integral annular collar; a bottom seat of the holding clamp disposed below the integral annular sealing ring groove; wherein two faces of the integral annular collar are substantially in contact; whereby an integral gap of the integral annular collar is minimized.

20. The pipe joint assembly of claim 19 wherein said female socket ring circumferentially envelopes the outer surface of said female socket at a protrusion adjacent to the sealing ring groove.

21. The pipe joint assembly of claim 19 wherein said female socket ring acts as a lock-support for the holding clamp during the secured lock-fit arrangement of the joint.

\* \* \* \* \*

UNITED STATES PATENT AND TRADEMARK OFFICE
CERTIFICATE OF CORRECTION

PATENT NO. : 8,579,334 B2
APPLICATION NO. : 13/057013
DATED : November 12, 2013
INVENTOR(S) : Helmuth Schnallinger et al.

It is certified that error appears in the above-identified patent and that said Letters Patent is hereby corrected as shown below:

In the Claims
In column 10, line 39 (claim 12), "socket it" should read -- socket is --
In column 11, line 27 (claim 17), "claim 16 insertion" should read -- claim 16 wherein insertion --
In column 11, line 28 (claim 17), "such, that" should read -- such that --
In column 12, line 6 (claim 19), "spigot said one pipe" should read -- spigot of said one pipe --
In column 12, line 17 (claim 19), "sealing ring grove" should read -- sealing ring groove --
In column 12, line 20 (claim 19), "a second lock-fitting" should read -- a secured lock-fitting --

Signed and Sealed this
Fourteenth Day of January, 2014

Michelle K. Lee
*Deputy Director of the United States Patent and Trademark Office*